(12) United States Patent
Qiu et al.

(10) Patent No.: US 8,238,063 B2
(45) Date of Patent: Aug. 7, 2012

(54) MAGNETORESISTIVE SENSOR WITH SYNTHETIC ANTIFERROMAGNETIC CAP OR SEED LAYERS

(75) Inventors: Jiaoming Qiu, St. Paul, MN (US); Hao Meng, Singapore (SG); Yonghua Chen, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 493 days.

(21) Appl. No.: 12/498,859

(22) Filed: Jul. 7, 2009

(65) Prior Publication Data

US 2011/0007427 A1    Jan. 13, 2011

(51) Int. Cl.
  *G11B 5/39* (2006.01)
(52) U.S. Cl. .................. 360/324.11; 360/324.12

(58) Field of Classification Search ........ 360/324–324.2
See application file for complete search history.

(56) References Cited

U.S. PATENT DOCUMENTS

| 6,178,074 B1 * | 1/2001 | Gill ........................... 360/324.2 |
| 6,781,801 B2 | 8/2004 | Heinonen et al. |
| 6,961,224 B2 * | 11/2005 | Pinarbasi ................. 360/324.11 |

* cited by examiner

*Primary Examiner* — Will J Klimowicz
(74) *Attorney, Agent, or Firm* — Hall Estill Attorneys at Law

(57) ABSTRACT

A magnetic sensor assembly including first and second shields, and a sensor stack between the first and second shields. The sensor stack includes a seed layer adjacent the first shield, a cap layer adjacent the second shield, and a magnetic sensor between the seed layer and the cap layer, wherein at least one of the seed layer and the cap layer has a synthetic antiferromagnetic structure.

21 Claims, 5 Drawing Sheets

MAGNETORESISTIVE SENSOR WITH SYNTHETIC ANTIFERROMAGNETIC CAP OR SEED LAYERS

BACKGROUND

Summary

The details of one or more embodiments of the invention are set forth in the accompanying drawings and the description below. These and various other features and advantages will be apparent from a reading of the following detailed description.

BRIEF DESCRIPTION OF DRAWINGS

In the drawings, like symbols indicate like elements. The drawings are not to scale.

DETAILED DESCRIPTION

A magnetic read/write head for use in a magnetic data storage device can be made by a process in which a layer of diamond like carbon (DLC) is applied on a tunneling magnetoresistive (TMR) or a current perpendicular-to-the-plane (CPP) sensor stack. A photoresistive material can be applied on the DLC layer, and portions of the photoresist and the sensor stack are then ion milled to provide a sensor with desired dimensions. A layer of an insulating material and a layer of a hard magnetic material are then applied over the ion milled structure, and chemical mechanical polishing (CMP) is utilized to abrade away portions of the hard magnetic material, the insulating material, and the photoresist down to the DLC layer. The DLC layer is then removed, and top electrode and shield layers are applied to form the finished read/write head.

To further decrease shield-shield spacing to a level below about 40 nanometers (nm), the thicknesses of the layers in the sensor stack should preferably be carefully controlled. The CMP steps in the process described above introduce undesirable variations in the thicknesses of the sensor layers, which can reduce the reliability of sensors having a shield-to-shield spacing of less than 40 nm.

To reduce sensor layer thickness variations caused by CMP, a magnetic cap and/or seed layer can be applied on the sensor stack adjacent to the sensor shields. These additional magnetic layers can act as sacrificial layers during the CMP process steps, and portions thereof remaining following CMP steps eventually become part of the sensor shields. However, the magnetic flux resulting from the shape anisotropy of these additional magnetic layers can apply a magnetic torque on the other layers in the sensor stack, which can cause undesirable signal losses. This unwanted magnetic torque can also destabilize layers in the sensor stack during manufacture, and may cause undesirable sensor instability.

To reduce CMP thickness variations without introducing undesirable additional magnetic torque, the present disclosure is directed to a sensor stack in which the cap and/or seed layers adjacent the shields are SAF (synthetic antiferromagnetic) structures. Unlike the sacrificial magnetic layers described above, the SAF structures lack shape anisotropy, and their balanced structure does not apply an undesirable torque on the other layers of the sensor stack. The SAF cap and seed layers reduce thickness variations caused by CMP steps, and sensor stacks with the SAF layers have reduced shield-to-shield spacing while retaining excellent signal strength.

Figure 1:
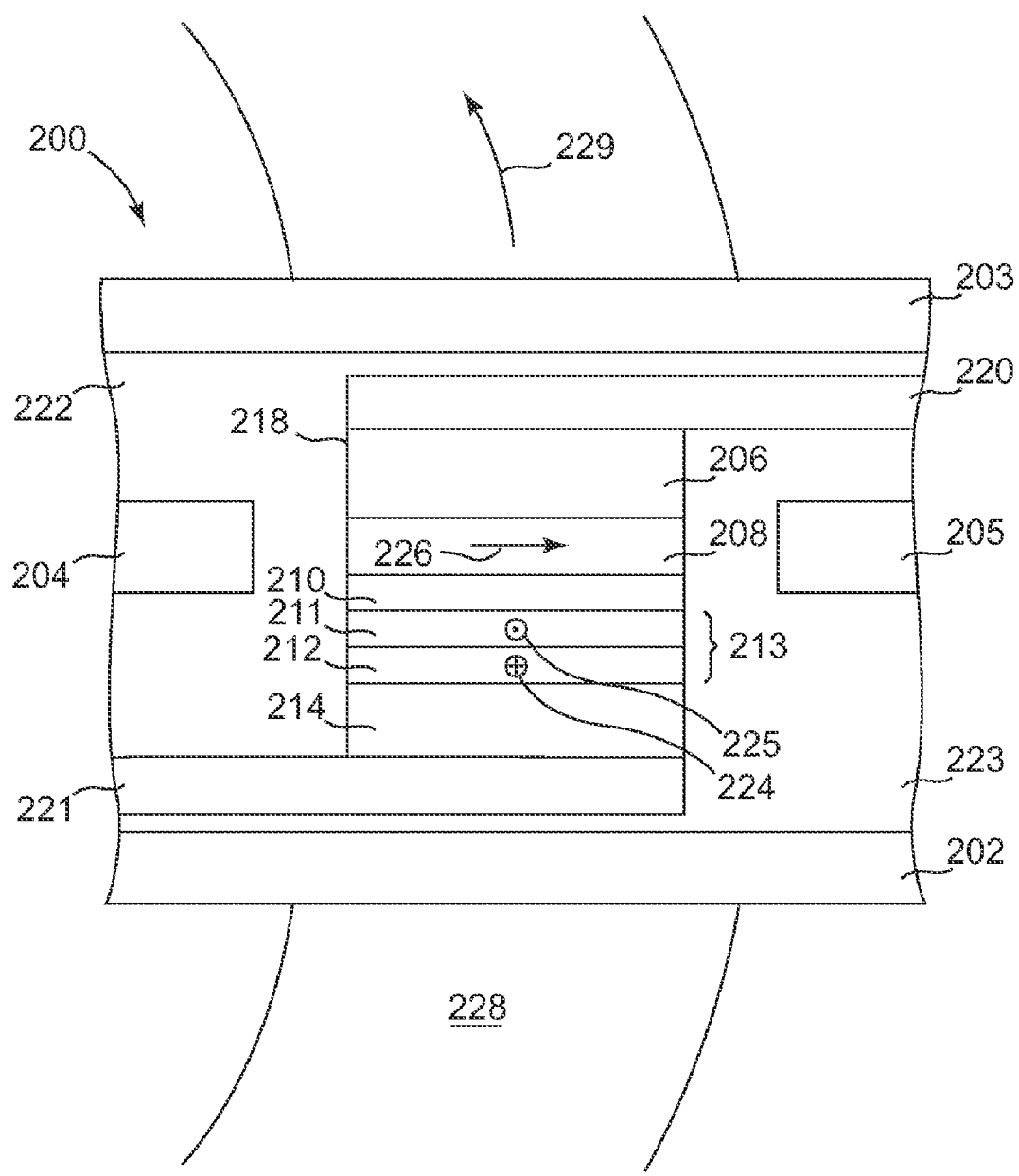
FIG. 1 is a schematic block diagram illustrating a hard disc read head including a tunneling magneto-resistance sensor.

FIG. 1 is a schematic block diagram illustrating an embodiment of a hard disc read head 200 that may be used with magnetic read/write head in a disc drive. The read head 200 utilizes magneto-resistance to read data from the data discs in the disc drive. While the precise nature of the read head 200 may vary widely, a tunneling magneto-resistive (MR) read head will be described as one example of a read head 200 that can be utilized with the SAF cap and seed layers described herein. It will be understood, though, that the SAF cap and seed layers may be used in any useful read head 200, such as, for example, a current perpendicular-to-the-plane (CPP) giant magneto-resistive head, a giant magneto-resistive head, or the like. Furthermore, the SAF cap and shield structures may be used in other applications where a high coercivity and/or a large saturation magnetization are desired.

Referring again to FIG. 1, the read head 200 flies over the surface of the disc drive data discs on an air bearing created by the rotation of the data discs. The data discs have a plurality of data tracks 228, one of which is shown in FIG. 1. The tracks 228 are divided into a plurality of bits. As the disc rotates in the direction of the arrow 229, the read head 200 follows a data track 228 and may read each bit as it passes under sensor 218.

The read head 200 includes a first shield layer 202 and a second shield layer 203, a tunneling magneto-resistive sensor 218 and two hard magnets 204, 205. The first and second shield layers 202, 203, which are made of a material having high magnetic permeability, reduce or substantially block extraneous magnetic fields, such as, for example, those from adjacent bits on data discs from impacting the sensor 218, thus improving the performance of the sensor 218. Ideally, the first and second shield layers 202, 203 permit magnetic fields from only the bit directly under sensor 218 to affect the sensor, and thus be read. Thus, as the physical size of bits continues to decrease, the shield-to-shield spacing should also be decreased.

The sensor 218 includes a plurality of layers, including an antiferromagnetic seed layer 214, a pinned layer 212, a reference layer 211, a tunneling barrier layer 210, a free layer 208 and a cap layer 206. The antiferromagnetic layer 214 is electrically coupled to a first electrode 221, and the cap layer 206 is electrically coupled to a second electrode 220. The pinned layer 212 is formed on and exchange coupled to the antiferromagnetic layer 214. The exchange coupling fixes the magnetic moment of the pinned layer 212 in a known orientation. Likewise, the magnetic moment of the pinned layer 212 induces a substantially antiparallel magnetic field in the reference layer 211. Together, the pinned layer 212 and the reference layer 211 form a synthetic antiferromagnet 213. The magnetic moments of each of the pinned layer 212 and the reference layer 211 are not allowed to rotate under magnetic fields in the range of interest (e.g., magnetic fields generated by the bits of data stored on the data discs). The magnetic moments of the reference layer 211 and the pinned layer 212 are generally oriented normal to the plane of FIG. 1 and anti-parallel to each other, as indicated by arrow tail 224 and arrow head 225 (e.g., into and out of the plane of FIG. 1).

The sensor also includes a free layer 208, which is not exchange coupled to an antiferromagnet. Thus, the magnetic moment of the free layer 208 is free to rotate under the influence of an applied magnetic field in the range of interest.

The read head 200 further includes a pair of bias magnets 204 and 205, which produce a magnetic field that biases the free layer 208 with a magnetic moment parallel to the plane of the figure and generally oriented horizontally, as indicated by arrow 226. This bias prevents the magnetic moment of the free layer 208 from drifting due to, for example, thermal energy, which may introduce noise into the data sensed by the read head 200. The bias is sufficiently small, however, that the magnetic moment of the free layer 208 can change in response to an applied magnetic field, such as a magnetic field of a data bit stored on the data discs. The sensor 218 and electrodes 220, 221 are separated and electrically isolated from the bias magnets 204, 205 by insulating materials 222, 223, respectively.

The tunneling barrier layer 210 separates the free layer 208 and the reference layer 211. The tunneling barrier layer 210 is sufficiently thin that quantum mechanical electron tunneling occurs between the reference layer 211 and the free layer 208. The electron tunneling is electron-spin dependent, making the magnetic response of the sensor 218 a function of the relative orientations and spin polarizations of the reference layer 211 and the free layer 208. The highest probability of electron tunneling occurs when the magnetic moments of the reference layer 211 and the free layer 208 are parallel, and the lowest probability of electron tunneling occurs when the magnetic moments of the reference layer 211 and the free layer 208 are antiparallel. Accordingly, the electrical resistance of the sensor 218 changes in response to an applied magnetic field. The data bits on the data discs in the disc drive are magnetized in a direction normal to the plane of FIG. 1, either into the plane of the figure, or out of the plane of the figure. Thus, when the sensor 218 passes over a data bit, the magnetic moment of the free layer 208 is rotated either into the plane of FIG. 1 or out of the plane of FIG. 1, changing the electrical resistance of the sensor 218. The value of the bit being sensed by the sensor 218 (e.g., either 1 or 0) may therefore be determined based on the current flowing from the first electrode 221 to the second electrode 220.

To increase the storage capacity of a magnetic data storage device such as a disc drive, the size of the magnetically oriented domains (bits) on the data discs is continually being made smaller to produce higher data densities. Accordingly, the size of read head 200 must be made smaller, and particularly, the shield to shield spacing must be decreased, so that the sensor 218 is substantially isolated from the magnetic fields of adjacent bits on data discs 108.

Figure 2:
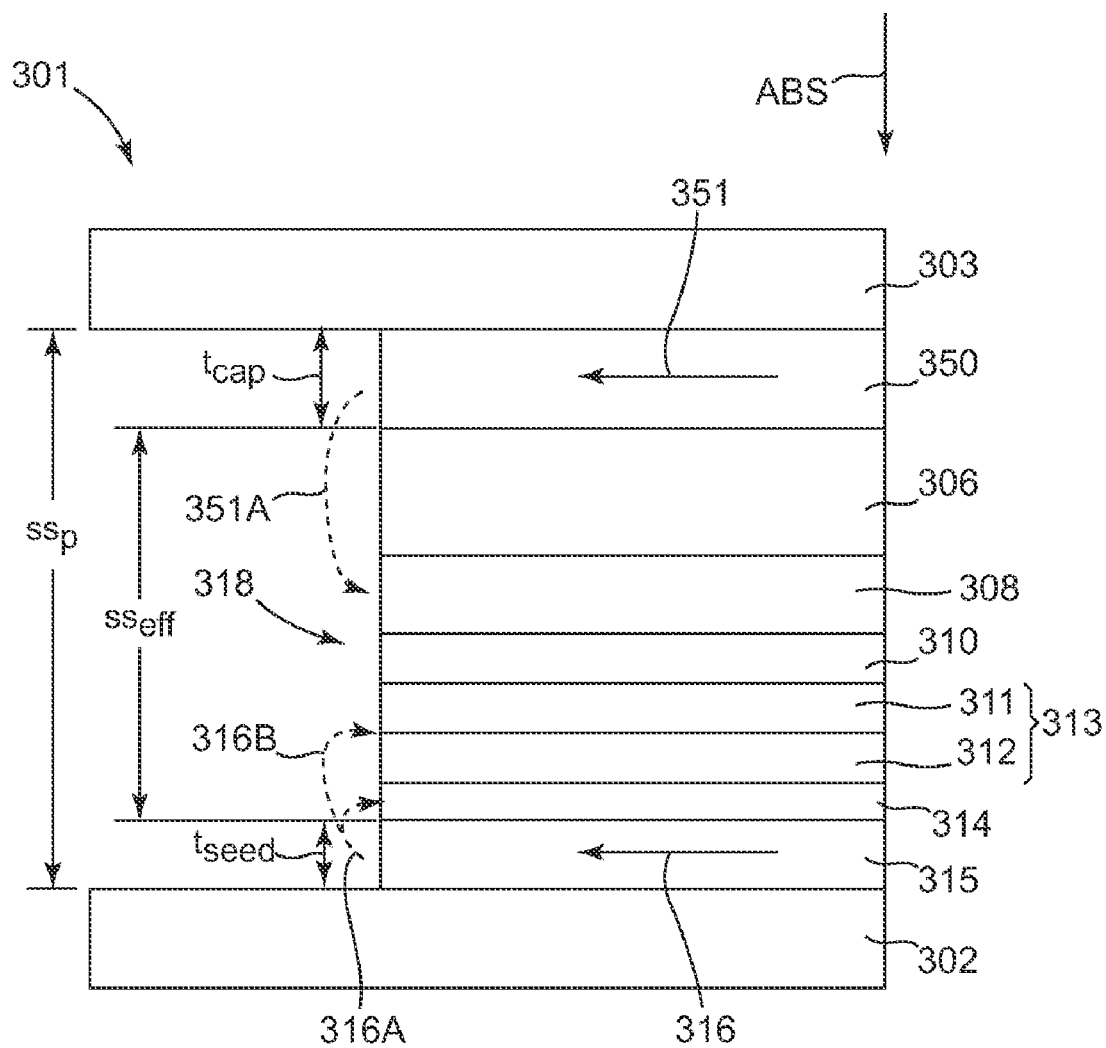
FIG. 2 is a schematic block diagram illustrating a tunneling magneto-resistance sensor assembly.

FIG. 2 is a simplified block diagram of a portion of a magnetic sensor assembly 301 in another read head for a data storage device such as a disc drive. The magnetic sensor assembly 301 in FIG. 2 is shown in a view normal to the air bearing surface (ABS) of FIG. 1. The head 300 includes a first shield layer 302 and a second shield layer 303, which provide a physical shield-to-shield spacing ($SS_p$). The shields 302, 303 can be made of a material such as, for example, NiFe. A TMR stack 318 may be formed by depositing successive layers in the first shield layer 302, or may be made in a separate process and later incorporated between the first and second shield layers 302, 303. The TMR stack 318 includes a seed layer 315, an antiferromagnetic (AFM) layer 314, a pinned layer 312, a reference layer 311, a tunneling barrier layer 310, a free layer 308, a first cap layer 306 made of a non-magnetic material such as Ta, and a second cap layer 350. Either the seed layer 315 or the second cap layer 350 may be made of a magnetic material such as NiFe, NiFeNb, NiFeTa, NiFeRh, CoZrTa, CoZrNb, CoZrNd, CoFeB, CoFeTa, CoFeZr, CoFeRh, CoFe, CoCr, or Ni>70% Cr<30%. When the seed layer 315 and/or the second cap layer 350 are made of a magnetic material, the effective shield-to-shield spacing ($SS_{eff}$) of the TMR stack 318 is reduced from the physical shield-to-shield spacing $SS_p$ by the thicknesses $t_{seed}$ and/or $t_{cap}$ of the seed layer 315/second cap layer 351. In other words, the effective shield-to-shield spacing $SS_{eff}$ is defined by the distance between the magnetic layers adjacent to or most proximate to sensor stack 318 in magnetic sensor assembly 301. In some embodiments, the seed layer 315 and the second cap layer 350 have a thickness of between about 10 Å and about 1,000 Å.

The magnetic materials used in the seed layer 315 and the second cap layer 350 have a magnetic moment parallel to the plane of the figure and generally oriented horizontally, as indicated by arrows 316 and 351, respectively. Due to shape anisotropy, magnetic flux from the magnetic seed layer 315 applies a magnetic torque along lines 316A and 316B, respectively, on the AFM layer 314, as well as to the synthetic antiferromagnet 313 formed by the pinned layer 312 and the reference layer 311. This torque can destabilize the AFM layer 314 as the TMR stack 318 is annealed during manufacture, and can also destabilize the synthetic antiferromagnet 313. The magnetic flux from the magnetic second cap layer 350 applies a magnetic torque along line 351A to the free layer 308. This causes the magnetic moment of the free layer 308 to align anti-parallel to the direction of the media field, which is opposite to the signal detection scheme and can result in undesirable signal losses.

Figure 3:
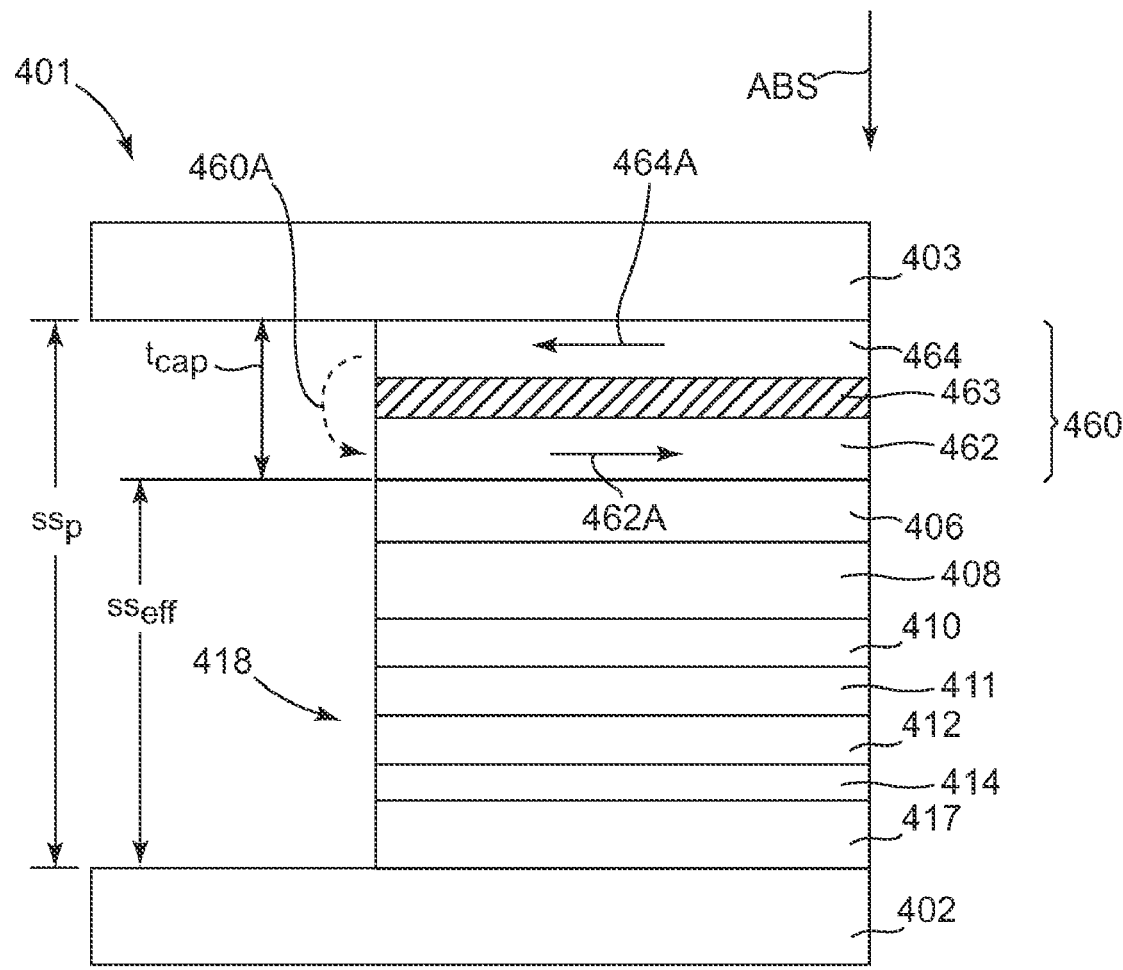
FIG. 3 is a schematic block diagram illustrating a tunneling magneto-resistance sensor assembly.

To reduce $SS_{eff}$ without introducing undesirable additional magnetic torque into the magnetic sensor assembly, FIG. 3 illustrates an embodiment of a magnetic sensor assembly 401 with a synthetic antiferromagnetic structured cap layer. Referring to FIG. 3, the magnetic sensor assembly 401 includes a first shield layer 402 and a second shield layer 403, which provide a physical shield-to-shield spacing ($SS_p$). The shield layers 402, 403 can be made of, for example, alloys such as NiFe. The TMR stack 418 may be formed by depositing successive layers in the first shield layer 402, or may be made in a separate process and later incorporated between the first and second shield layers 402, 403. The stack 418 can be made by a wide variety of processes including, for example, PVD (physical vapor deposition), IBD (ion beam deposition), CVD (chemical vapor deposition), plating or electrochemical deposition, PLD (pulsed laser deposition), and MBE (molecular beam epitaxy).

The TMR stack 418 includes a non-magnetic seed layer 417, an AFM layer 414, a pinned layer 412, a reference layer 411, a tunneling barrier layer 410, a free layer 408 and a first cap layer 406 made of a non-magnetic material such as, for example, Ta.

The non-magnetic seed layer 417 can be made of a wide variety of materials such as, for example, Ta, Ru, Cr or combinations thereof. Suitable materials for the first cap layer 406 include, for example, Ta, Ru, Cr or combinations thereof.

The stack 418 further includes a second cap layer 460 with a synthetic antiferromagnetic structure and a thickness $t_{cap}$. The second cap layer 460 includes a layer of a first shield material 462 having a magnetic moment generally aligned along a direction indicated by the arrow 462A, as well as a layer of a second shield material 464 having a magnetic moment generally aligned along a direction indicated by the arrow 464A. The first and second shield materials may be the same or different. The first and second shield materials 462, 464 may be the same as the materials used to make the shield 403

(e.g. NiFe), or may be selected from different materials such as, for example, $NiFe_x$, FeCo, Fe, Ni or a combination thereof. In some embodiments, an antiferromagnetic (AFM) coupling layer 463 resides between the first shield material 462 and the second shield material 464. Suitable materials for the AFM coupling layer 463 include, but are not limited to, Ru.

When the second cap layer 460 is made of a synthetic antiferromagnetic material, the effective shield-to-shield spacing ($SS_{eff}$) of the TMR stack 418 is reduced from the physical shield-to-shield spacing $SS_p$ by the thickness $t_{cap}$ of the cap layer 460.

In some embodiments, the second cap layer 460 has a thickness of between about 10 Å and about 1,000 Å. The thickness of the second cap layer 460 should preferably be small but sufficient to tolerate CMP variations, and the thickness is typically between about 2 nm and about 10 nm.

However, unlike the magnetic second cap layer 350 shown in FIG. 2, the antiferromagnetic layer 460 has a balanced magnetic structure, so the magnetic flux of the layer 460 is applied along the direction shown by arrow 460A. Thus, while reducing the $SS_{eff}$, the layer 460 applies no additional unwanted magnetic torque to the free layer 408, and preserves the signal strength of the TMR stack 418.

Figure 4:
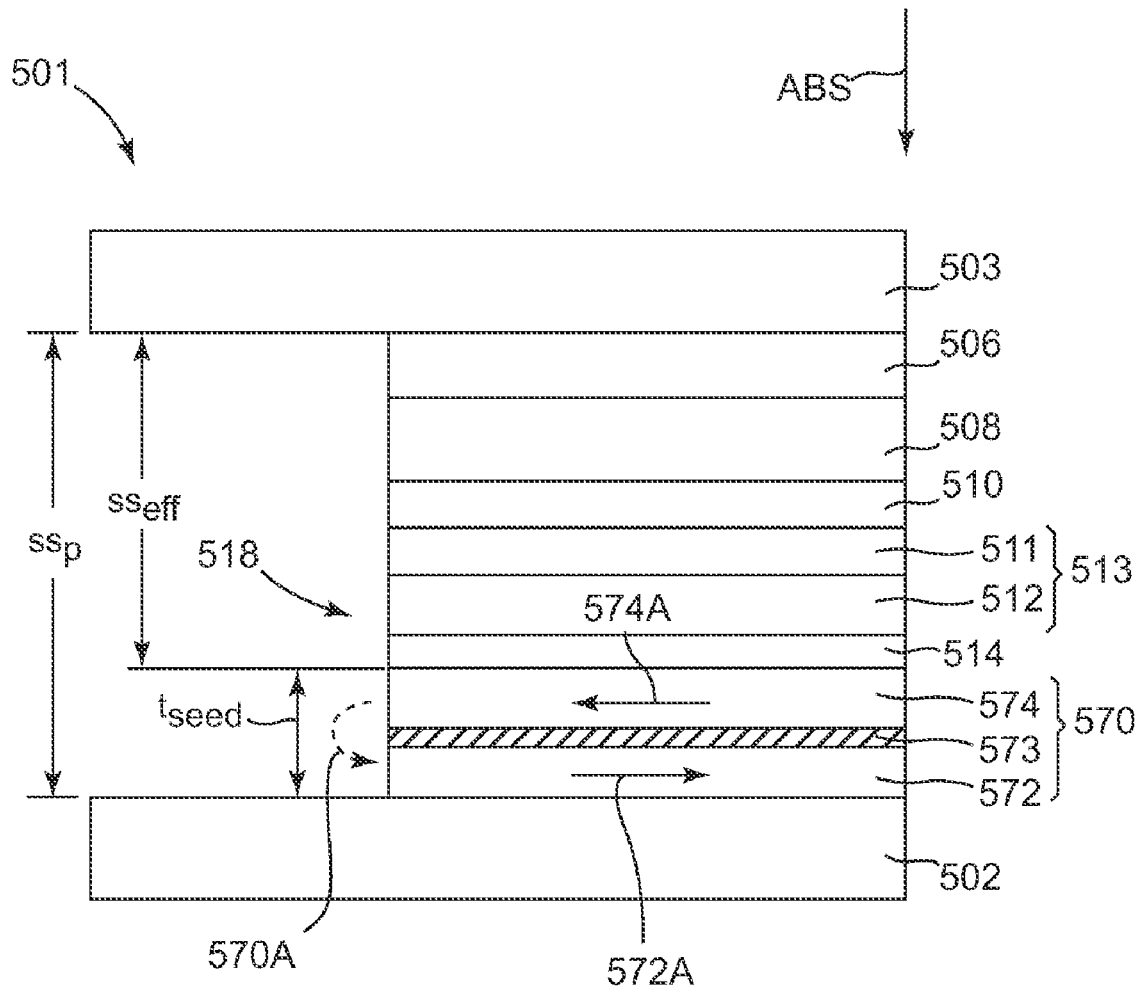
FIG. 4 is a schematic block diagram illustrating a tunneling magneto-resistance sensor assembly.

To reduce $SS_{eff}$ without introducing undesirable additional magnetic torque into the magnetic sensor assembly, FIG. 4 illustrates an embodiment of a magnetic sensor assembly 501 with a synthetic antiferromagnetic structured seed layer. Referring to FIG. 4, the magnetic sensor assembly 501 includes a first shield layer 502 and a second shield layer 503, which provide a physical shield-to-shield spacing ($SS_p$). The shield layers 502, 503 can be made of, for example, alloys such as NiFe. The TMR stack 518 may be formed by depositing successive layers on the first shield layer 502, or may be made in a separate process and later incorporated between the first and second shield layers 502, 503. The TMR stack 518 further includes an AFM layer 514, a pinned layer 512, a reference layer 511, a tunneling barrier layer 510, a free layer 508 and a cap layer 506.

The TMR stack 518 further includes a seed layer 570 with a synthetic antiferromagnetic structure and a thickness $t_{seed}$. The seed layer 570 includes a layer of a first shield material 572 having a magnetic moment generally aligned along a direction indicated by the arrow 572A, as well as a layer of a second shield material 574 having a magnetic moment generally aligned along a direction indicated by the arrow 574A. The first and second shield materials making up the layers 572, 574 may be the same or different. The first and second materials in the layers 572, 574 may be the same as the materials used to make the shields 502 or 503 (e.g. NiFe), or may be selected from different materials such as, for example, $NiFe_x$, FeCo, Fe, Ni or a combination thereof. In some embodiments, an AFM coupling layer 573 resides between the first shield material 572 and the second shield material 574. Suitable materials for the AFM coupling layer 573 include, but are not limited to, Ru.

When the seed layer 570 is made of a synthetic antiferromagnetic material, the effective shield-to-shield spacing ($SS_{eff}$) of the TMR stack 518 is reduced from the physical shield-to-shield spacing $SS_p$ by the thickness $t_{seed}$ of the seed layer 570. In some embodiments, the seed layer 570 has a thickness of between about 10 Å and about 1,000 Å. However, unlike the magnetic seed layer 315 shown in FIG. 3, the antiferromagnetic seed layer 570 has a balanced magnetic structure, so the magnetic flux of the layer 570 is applied along the direction shown by arrow 570A. Thus, while reducing the $SS_{eff}$, the layer 570 applies additional unwanted magnetic torque to neither the AFM layer 514 nor the synthetic antiferromagnet 513, which preserves the stability of the TMR stack 518.

Figure 5:
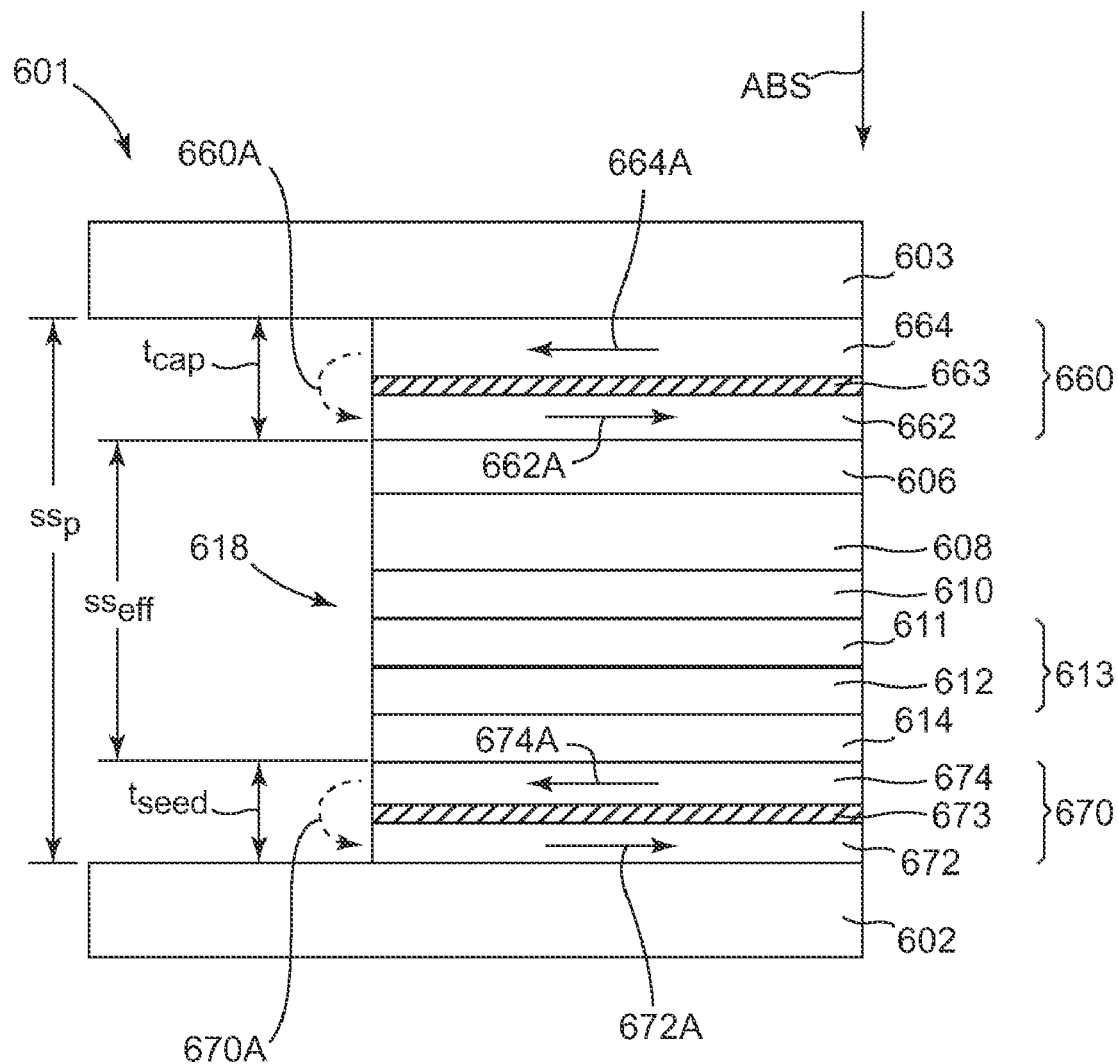
FIG. 5 is a schematic block diagram illustrating a tunneling magneto-resistance sensor assembly.

In yet another embodiment shown in FIG. 5, a magnetic sensor assembly 601 includes a first shield layer 602 and a second shield layer 603, which provide a physical shield-to-shield spacing ($SS_p$). The shield layers 602, 603 can be made of, for example, alloys such as NiFe. The TMR stack 618 may be formed by depositing successive layers on the first shield layer 602, or may be made in a separate process and later incorporated between the first and second shield layers 602, 603. The TMR stack 618 further includes an AFM layer 614, a pinned layer 612, a reference layer 611, a tunneling barrier layer 610, a free layer 608 and a first cap layer 606.

The TMR stack 618 further includes a seed layer 670 with a synthetic antiferromagnetic structure and a thickness $t_{seed}$. The seed layer 670 includes a layer of a first shield material 672 having a magnetic moment generally aligned along a direction indicated by the arrow 672A, as well as a layer of a second shield material 674 having a magnetic moment generally aligned along a direction indicated by the arrow 674A. The first and second shield materials making up the layers 672, 674 may be the same or different. The first and second shield materials in the layers 672, 674 may be the same as the materials used to make the shield 602 (e.g. NiFe), or may be selected from different materials such as, for example, $NiFe_x$, FeCo, Fe, Ni or a combination thereof. In some embodiments, an AFM coupling layer 673 resides between the first shield material 672 and the second shield material 674. Suitable materials for the AFM coupling layer 673 include, but are not limited to, Ru.

When the seed layer 670 is made of a synthetic antiferromagnetic material, the effective shield-to-shield spacing ($SS_{eff}$) of the TMR stack 618 is reduced from the physical shield-to-shield spacing $SS_p$ by the thickness $t_{seed}$ of the seed layer 670. In addition, when the bottom synthetic antiferromagnetic seed layer 670 is present, the non-magnetic seed layer 614 can optionally be removed to further reduce shield-to-shield spacing. In some embodiments, the seed layer 670 has a thickness of between about 10 Å and about 1,000 Å. The antiferromagnetic seed layer 670 has a balanced magnetic structure, so the magnetic flux of the layer 670 is applied along the direction shown by arrow 670A. Thus, while reducing the $SS_{eff}$, the layer 670 applies additional unwanted magnetic torque to neither the AFM layer 614 nor the synthetic antiferromagnet 613, which preserves the stability of the TMR stack 618.

The TMR stack 618 further includes a second cap layer 660 with a synthetic antiferromagnetic structure and a thickness $t_{cap}$. The second cap layer 660 includes a layer of a first shield material 662 having a magnetic moment generally aligned along a direction indicated by the arrow 662A, as well as a layer of a second shield material 664 having a magnetic moment generally aligned along a direction indicated by the arrow 664A. The first and second materials may be the same or different. The first and second materials may be the same as the materials used to make the shield 603 (e.g. NiFe), or may be selected from different materials such as, for example, $NiFe_x$, FeCo, Fe, Ni or a combination thereof. In some embodiments, an AFM coupling layer 663 resides between the first shield material 662 and the second shield material 664. Suitable materials for the antiferromagnetic (AFM) coupling layer 663 include, but are not limited to, Ru.

When the second cap layer 660 is made of a synthetic antiferromagnetic material, the effective shield-to-shield spacing ($SS_{eff}$) of the TMR stack 618 is reduced from the physical shield-to-shield spacing $SS_p$ by the thickness $t_{cap}$ of the cap layer 660. In some embodiments, the second cap layer 660 has a thickness of between about 10 Å and about 1,000 Å. The antiferromagnetic second cap layer 660 has a balanced magnetic structure, so the magnetic flux of the layer 660 is applied along the direction shown by arrow 660A. Thus, while reducing the $SS_{eff}$, the layer 660 applies no additional unwanted magnetic torque to the free layer 608, and preserves the signal strength of the TMR stack 618.

Various embodiments of the invention have been described. The implementations described above and other implementations are within the scope of the following claims.

The invention claimed is:

1. A magnetic sensor assembly comprising first and second shields, and a sensor stack between the first and second shields, wherein the sensor stack comprises a seed layer adjacent the first shield, a cap layer adjacent the second shield, and a magnetic sensor between the seed layer and the cap layer, wherein at least the seed layer has a synthetic antiferromagnetic structure.

2. The magnetic sensor assembly of claim 1, wherein the magnetic sensor comprises a tunneling magnetoresistive (TMR) sensor.

3. The magnetic sensor assembly of claim 1, wherein the sensor stack comprises a first cap layer and a second cap layer adjacent the second shield, wherein the second cap layer has a synthetic antiferromagnetic structure.

4. The magnetic sensor assembly of claim 3, wherein the second cap layer comprises a layer of a first shield material and a layer of a second shield material, which may be the same or different, and wherein the first shield material and the second shield material comprise at least one of NiFe alloy, FeCo, Fe, or Ni.

5. The magnetic sensor assembly of claim 4, further comprising an antiferromagnetic coupling layer between the layer of the first shield material and the layer of the second shield material.

6. The magnetic sensor assembly of claim 5, wherein the antiferromagnetic coupling layer comprises Ru.

7. The magnetic sensor assembly of claim 1, wherein the seed layer comprises a first seed layer adjacent the first shield and having a synthetic antiferromagnetic structure, and a second anti ferromagnetic layer.

8. The magnetic sensor assembly of claim 7, wherein the first seed layer comprises a layer of a first shield material and a layer of a second shield material, which may be the same or different, and wherein the first shield material and the second shield material comprise at least one of NiFe alloy, FeCo, Fe, or Ni.

9. The magnetic sensor assembly of claim 8, further comprising an antiferromagnetic coupling layer between the layer of the first shield material and the layer of the second shield material.

10. The magnetic sensor assembly of claim 9, wherein the antiferromagnetic coupling layer comprises Ru.

11. The magnetic sensor assembly of claim 1, wherein each of the seed layer and the cap layer comprise a synthetic antiferromagnetic structure.

12. A magnetic sensor assembly comprising:
a first shield layer and a first seed layer adjacent the first shield layer, wherein the first seed layer comprises a first synthetic antiferromagnetic structure:
a sensor stack adjacent the seed layer, wherein the sensor stack comprises a magnetic sensor;
a first cap layer adjacent the sensor stack, wherein the first cap layer comprises a second synthetic antiferromagnetic structure; and
a second shield layer adjacent the first cap layer.

13. The magnetic sensor assembly of claim 12, wherein the assembly further comprises an antiferromagnetic layer adjacent the first seed layer.

14. The magnetic sensor assembly of claim 12, wherein the assembly further comprises a second cap layer adjacent the first cap layer, wherein the second cap layer comprises Ta.

15. The magnetic sensor assembly of claim 12, wherein each of the first and second synthetic antiferromagnetic structures comprise a layer of a first shield material, a layer of a second shield material, and an anti ferromagnetic coupling layer between the layer of the first shield material and the layer of the second shield material.

16. The magnetic sensor assembly of claim 15, wherein the antiferromagnetic coupling layer comprises Ru.

17. A read/write head for a data storage device, wherein the head comprises a magnetic sensor assembly, and wherein the magnetic sensor assembly comprises:
a first shield layer and a first seed layer adjacent the first shield layer, wherein the first seed layer comprises a synthetic antiferromagnetic structure;
a sensor stack adjacent the seed layer, wherein the sensor stack comprises a magnetic sensor;
a first cap layer adjacent the sensor stack, wherein the first cap layer comprises a synthetic antiferromagnetic structure; and
a second shield layer adjacent the first cap layer.

18. The read/write head of claim 17, wherein the assembly further comprises an antiferromagnetic seed layer adjacent the first seed layer.

19. The read/write head of claim 17, wherein the assembly further comprises a second cap layer adjacent the first cap layer, and wherein the second cap layer comprises Ta.

20. The read/write head of claim 17, wherein the data storage device is a disc drive.

21. The read/write head of claim 17, wherein the magnetic sensor comprises a TMR sensor.

* * * * *